I. P. Tice.
Spirit-Meter.
Nº 72702.   Patented Dec. 24, 1867.
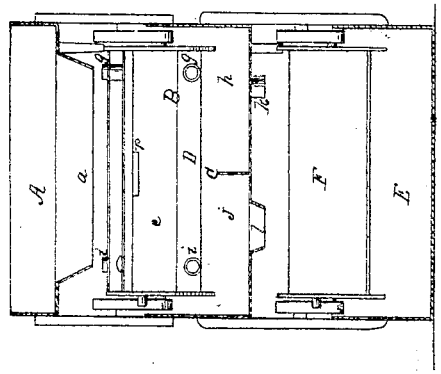
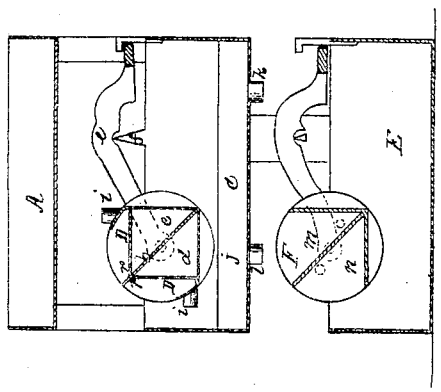
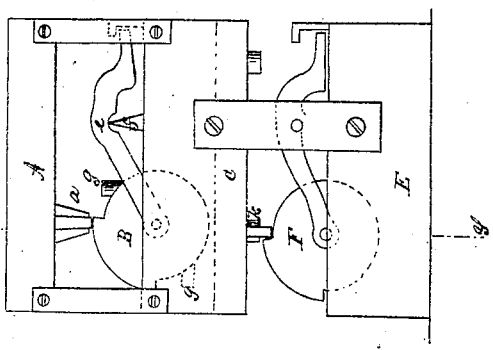
Witnesses
J. W. Coombs
A. Kellere
Inventor
Isaac P. Tice

United States Patent Office.

ISAAC P. TICE, OF NEW YORK, N. Y.

Letters Patent No. 72,702, dated December 24, 1867.

---

IMPROVEMENT IN SPIRIT-METERS.

---

The Schedule referred to in these Letters Patent and making part of the same.

---

TO ALL WHOM IT MAY CONCERN:

Be it known that I, ISAAC P. TICE, of the city, county, and State of New York, have invented a new and useful Improvement in Spirit-Meters, of which the following is a full, clear, and exact description, reference being had to the accompanying drawing, forming part of this specification, and in which—

Figure 1 represents a side elevation of a meter, or meter in part, in illustration of my improvement, and Figures 2 and 3 are sectional elevations, at right angles to each other, of the same, the latter section being taken through the line $y\ y$ in fig. 1.

Similar letters of reference indicate corresponding parts.

This, my invention, has reference to measuring the spirit passed through the meter by its specific gravity, or weight in proportion to a given volume, and consists in determining the same by the weight of the surplus over and above the amount required to fill a weighing or measuring-can of a given capacity.

Referring to the accompanying drawing, A represents a common receptacle of spirit from the "still," which passes from the same by a spout, $a$, to a weighing-can, B, of a tilting character, and divided by a diaphragm, $b$, into chambers, $c$ and $d$, and hung on a weighted lever, $e$, as on a fulcrum, at $f$, to discharge, as it tilts alternately in opposite directions, into a receiver, C, as in other tilting and weighing-arrangements. This can B is so weighted or hung as that, in the case of the fluid passing being water, it will tilt or tip to discharge so soon as either of the chambers $c$ or $d$ becomes filled; but in case of spirit or diluted spirit, then, a greater volume being required to give the necessary weight to tilt the can, the same is provided for by an overflow or surplus quantity acting on the can to tilt or tip it, as in a previous invention of mine, the chambers $c$ and $d$ delivering, as the can tilts, by spouts $g$, into one division, $h$, of the receiver C, while the overflow or surplus contained within trays D discharges, by spouts $i$, into the other division, $j$, of said receiver, as also in a previous arrangement or arrangements.

From this description, it will be seen that the can B only tilts when a sufficient weight has been thrown upon it, which, in the case of spirit or diluted spirit, will not take place till a sufficient quantity (dependent upon the specific gravity or strength of the spirit) has passed into the overflow or surplus-trays D, to give the necessary weight to tilt the can B. The volume of spirit from the chambers $c$ and $d$ passes off, as before observed, by spouts $g$, into one division, $h$, of the receiver C, and from thence, by a spout, $k$, into a receiver, E, into which, also, the overflow or surplus discharged by the spouts $i$ delivers, by a spout, $l$, but not direct, such delivery being through the intervention of a weighing-can, F, of a weighted tilting character, and formed of chambers $m\ n$, operating as or after the fashion of other weighing-cans. In this way, it will be seen, only the surplus or overflow is weighed; but as the necessary weight to tilt the can B is known, the weight indicated and registered by the can F, taken in connection with the discharge from the chambers $c$ and $d$ of the can B, will give the specific gravity or strength of the spirit, the weight of the overflow which governs the lifting action of the can B determining the same, and being ascertained and recorded through a suitable register by the second weighing-can, F What is here claimed, and desired to be secured by Letters Patent, is—

Registering the specific gravity or strength of the spirit passing through the meter by means of weighing-cans, so arranged and operating as that the overflow or surplus of the one can is weighed and recorded by the second, while the main contents of such first can are diverted from passing through the second or lower can, substantially as specified.

ISAAC P. TICE.

Witnesses:
A. LE CLERC.
J. W. COOMBS.